(12) United States Patent
Sida

(10) Patent No.: US 6,491,305 B2
(45) Date of Patent: Dec. 10, 2002

(54) CHUCK AND GRIPPING CLAWS FOR CHUCK

(75) Inventor: Youichiro Sida, Kanagawa (JP)

(73) Assignee: Sida Seisakusyo, Co., Yokohama (JP)

( * ) Notice: Subject to any disclaimer, the term of this patent is extended or adjusted under 35 U.S.C. 154(b) by 0 days.

(21) Appl. No.: 09/846,241

(22) Filed: May 2, 2001

(65) Prior Publication Data

US 2001/0048204 A1 Dec. 6, 2001

(30) Foreign Application Priority Data

May 16, 2000 (JP) ........................................ 2000-142740
Jan. 29, 2001 (JP) ........................................ 2001-020300

(51) Int. Cl.⁷ ............................................... B23B 31/16
(52) U.S. Cl. .................... 279/124; 279/110; 279/123; 279/153
(58) Field of Search ................... 279/110, 123, 279/124, 152–154, 78, 77; 403/294, 378, 314; 269/279, 280, 282–284

(56) References Cited

U.S. PATENT DOCUMENTS

| | | | | |
|---|---|---|---|---|
| 2,667,358 A | * | 1/1954 | Highberg | 279/123 |
| 3,219,356 A | * | 11/1965 | Wilterdink et al. | 279/123 |
| 3,744,808 A | * | 7/1973 | Hughes | 279/123 |
| 4,898,371 A | * | 2/1990 | Mills et al. | 269/280 |
| 5,076,596 A | * | 12/1991 | Jaggers | 279/123 |
| 5,163,693 A | * | 11/1992 | Jaggers | 279/124 |
| 5,174,589 A | * | 12/1992 | Gulde | 279/124 |
| 6,022,010 A | * | 2/2000 | Bernstein | 269/279 |

* cited by examiner

Primary Examiner—Steven C. Bishop
(74) Attorney, Agent, or Firm—Oblon, Spivak, McClelland, Maier & Neustadt, P.C.

(57) ABSTRACT

A chuck comprises: a chuck body attached to a spindle of a machine tool; master jaws attached to the chuck body along the normal of the chuck body and formed with T-shaped grooves extending along the length thereof; T nuts having tops and trunks, the tops being slidably fitted in the T-shaped grooves of the master jaws; gripping claws having work holding surfaces and grooves for engagement with the trunks of the T nuts; and eccentric shafts inserted into holes formed across the T nuts and the gripping claws and used for attaching the gripping claws to the T nuts. The holes extend across the T nuts and the gripping claws which are engaged with one another. The gripping claws have large reshaping margins at work holding surfaces thereof.

19 Claims, 20 Drawing Sheets

(a)

(b)

(c)

(a)

(b)

(c)

(a)

(b)

(c)

(d)

(a)

(b)

(a)

(b)

(a)

(b)

(c)

(a)

(b)

(c)

(d)

(e)

(a)

(b)

(a)　　　(b)

BACKGROUND ART

BACKGROUND ART

CHUCK AND GRIPPING CLAWS FOR CHUCK

DETAILED DESCRIPTION OF THE INVENTION

1. Field of the Invention

The present invention relates to a chuck used to hold a work on a machine tool.

2. Description of the Related Art

A chuck is usually used in order to hold a work on a spindle of a machine tool such as a lathe.

Referring to FIGS. 27 and 28 of the accompanying drawings, a chuck 100 of the related art comprises: a chuck body 1 attached to a spindle of a machine tool; master jaws 2 fixedly positioned in the chuck body 1 along the normal of the chuck body 1 and having T-shaped grooves 2a extending along the length thereof; T nuts 3 having heads 3a and trunks 3b, the heads 3a being slidable in the T-shaped grooves 2a along the normal of the chuck body 1; gripping claws 4 having work holding surfaces 4a and grooves 4b engageable with the trunks 3b of the T nuts 3; and claw attaching members 5 inserted into holes 3c and 4c extending across the T nuts 3 and the gripping claws 4 which are engaged with one another. In this case, the claw attaching members 5 are bolts.

In this chuck 100, the gripping claws 4 usually have their work holding surfaces 4a shaped in order to reliably grip the work.

Therefore, the work holding surfaces 4a of the gripping claws 4 are re-shaped each time they are applied to works having different shapes. Further, even if works of the same shape are to be held, the work holding surfaces 4a have to be reshaped in order to reliably grip the works each time a machining process is changed. The work holding surfaces 4a gradually wear out, so that they should have large reshaping margins as possible.

With the chuck 100 of the related art, the holes 3c and 4c vertically extend through the T nuts 3 and the gripping claws 4 where the claw attaching members 5 are inserted are in parallel with the spindle 0 of the chuck 100, as shown in FIGS. 27 and 28.

With the related art, the holes 3c and 4c occupy a large portion of each gripping claw 4, which means that reshaping margins of the work holding surfaces 4a of the gripping claws 4 are reduced. This would lead to shorter life of the gripping claws 4, which is uneconomical.

Bolts are used as the claw attaching members in the related art, so that it is troublesome to attach the gripping claws to the T nuts. Further, since the bolts are inserted into threaded holes in the T nuts, it is time consuming to make such threaded holes. Sometimes, chips may remain in the threaded holes, which would lead to damages on the threaded holes and threads on the bolts.

SUMMARY OF THE INVENTION

The present invention has been contemplated in order to overcome the foregoing problems of the related art, and is intended to provide a chuck in which gripping claws have a little space for holes into which claw attaching members are inserted, and have sufficient reshaping margins of work holding surfaces. The invention further provides gripping claws for such a chuck.

Another object of the invention is to provide a chuck in which gripping claws can be easily attached to T nuts, and to provide gripping claws for such a chuck.

According to a first feature of the invention, there is provided a chuck comprising: a chuck body attached to a spindle of a machine tool; master jaws attached to the chuck body along the normal of the chuck body and formed with T-shaped grooves extending along the length thereof; T nuts having tops and trunks, the tops being slidably fitted in the T-shaped grooves of the master jaws; gripping claws having work holding surfaces and grooves for engagement with the trunks of the T nuts; and claw attaching members inserted into holes in the T nuts and the gripping claws and used for attaching the gripping claws to the T nuts. In the chuck, the holes are formed across the T nuts and the gripping claws which are engaged with one another. This structure is effective in increasing reshaping margins of the wok holding surfaces of the gripping claws, improving the life of the gripping claws, and reducing the running cost of the chuck.

The claw attaching members are constituted by eccentric shafts which have eccentric cams, are rotated and relatively move the T nuts and the gripping claws. The holes in the T nuts and the gripping claws are provided with cam parts with which the cams of the eccentric shafts come into contact.

The gripping claws can be easily attached to the T nuts by slightly turning the eccentric shafts. The holes into which the eccentric shafts are inserted can be formed with ease. Chips remaining in these holes would not extensively damage them.

The holes in the T nuts have cam parts with which cam parts of the eccentric shafts come into contact.

The eccentric shafts have cylindrical stems which are inserted into the holes of the gripping claws. The cams of the eccentric shafts inserted into the holes of the T nuts are thinner than the cylindrical stems, which is effective in preventing chips from getting to the cams of the eccentric shafts, and improving the life of the chuck.

In accordance with a second feature of the invention, there is provided a gripping claw for the foregoing chuck. The gripping claw has a groove for engagement with the trunk of the T nut, and has holes into which the claw attaching members are inserted for attachment of the gripping claw to the T nut, and the holes extend across the T nut and the gripping claw which are engaged.

THE PREFERRED EMBODIMENT OF THE INVENTION

Figure 1:
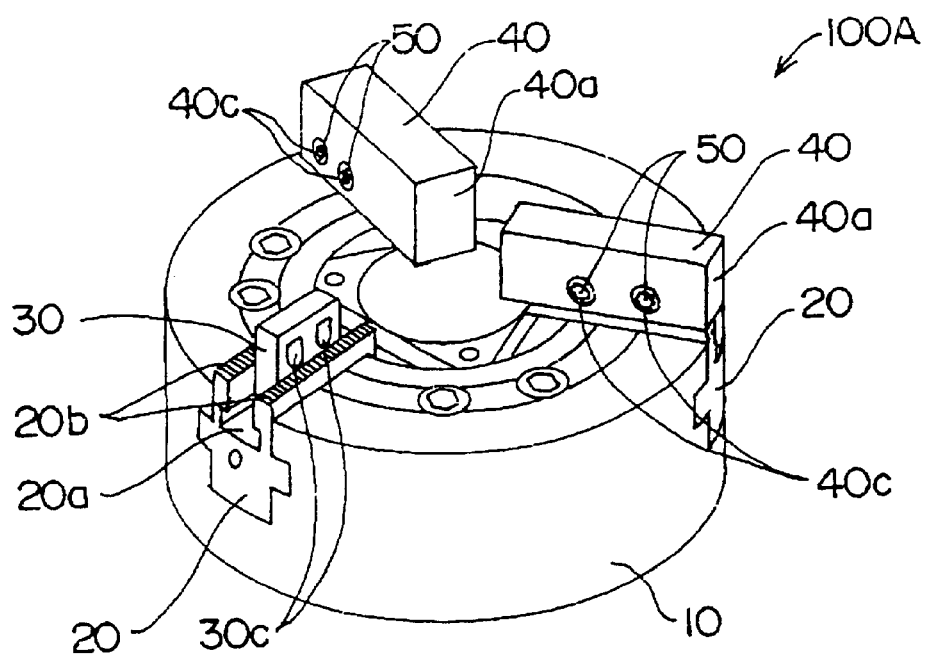
FIG. 1 is a perspective view of a chuck according to an embodiment of the invention.

The invention will be described hereinafter with reference to one embodiment shown in the drawing figures.

Figure 2:
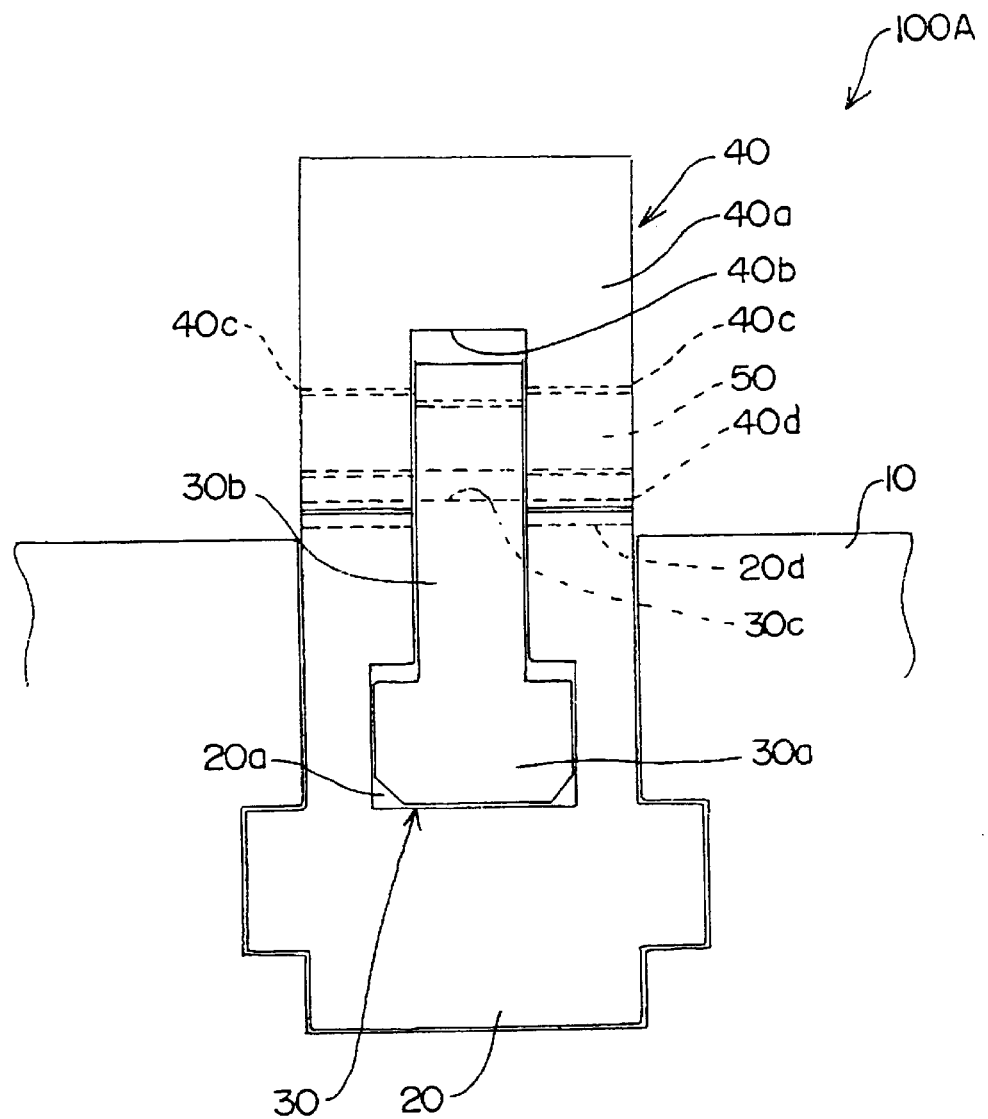
FIG. 2 is a schematic front view of the chuck of FIG. 1, showing how essential parts such as a T nut, a gripping claw and an eccentric shaft are attached to a master jaw.

Referring to FIGS. 1 and 2, a chuck 100A comprises a chuck body 10, master jaws 20, T nuts 30, gripping claws 40, and eccentric shafts 50 as claw attaching members, similarly to the chuck 100 of the related art.

With the chuck 100A, the gripping claws 40, T nuts 30 and master jaws 20 are assembled in the chuck body 10 having a particular size, e.g. an 8-inch chuck body, a six-inch chuck body and so on, and are available as a set of chuck claws.

This chuck 100A includes three sets of chuck claws, which are provided on a top surface of the chuck body 10 (in this example), and are equally spaced by 120° C.

It is assumed here that a work is in the shape of a shaft. As is well-known, the three sets of chuck claws slide along the normal of the chuck body 10, and grip an outer surface of the work with inner work holding surfaces 40a of the gripping claws 40, thereby allowing the work to be reliably gripped by the chuck 100A.

If the work is cylindrical, the three chuck claws slide along the normal of the chuck body 10, and grip the inner surface of the work with outer work holding surfaces 40a of the gripping claws 40. Thus, the work is reliably gripped by the chuck 100A.

The following describe the essential parts of the chuck 100A such as the T nuts 30, gripping claws 40 and eccentric shafts 50.

Figure 3:
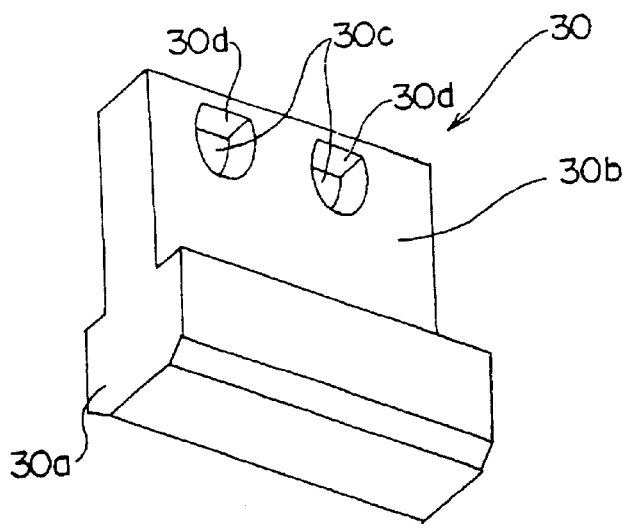
FIG. 3(a) is a perspective view of an example of the T nut.
FIG. 3(b) is a side elevation of the T nut.
FIG. 3(c) shows the state in which a cylindrical portion of the eccentric shaft is inserted into a hole in the T nut.
Figure 3:
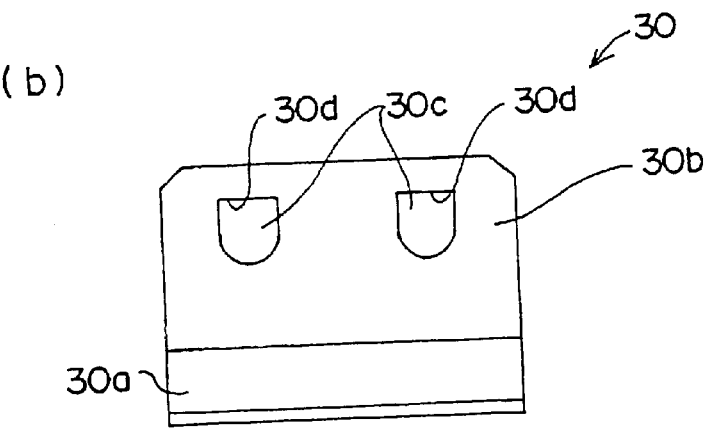
Figure 3:
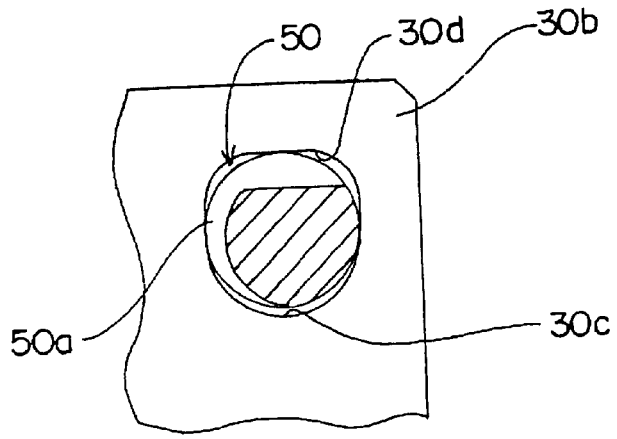

One example of the T nuts 30 is shown in FIG. 3(a) to FIG. 3(c). This T nut 30 has a head 30a and a trunk 30b as integral parts. The head 30a is shaped to be slidable in a T-shaped groove 20a of the master jaw 20 along the normal of the chuck body 10.

The master jaw 20 is attached to the chuck body 10 which is fixedly attached to a work spindle (not shown) of the machine tool, and has its position hydraulically adjusted along the normal of the chuck body 10.

The T nut 30 has two holes 30c formed across its trunk 30b, through which the eccentric shafts 50 pass. The holes 30c are sized so as to enable stems 50a of the eccentric shafts 50 to smoothly pass therethrough (as described in detail later). Further, the holes 30c of the T nut 30 are formed with flat parts with which flat parts 50d of cams 50b of the eccentric shafts 50 are brought into contact.

Figure 4:
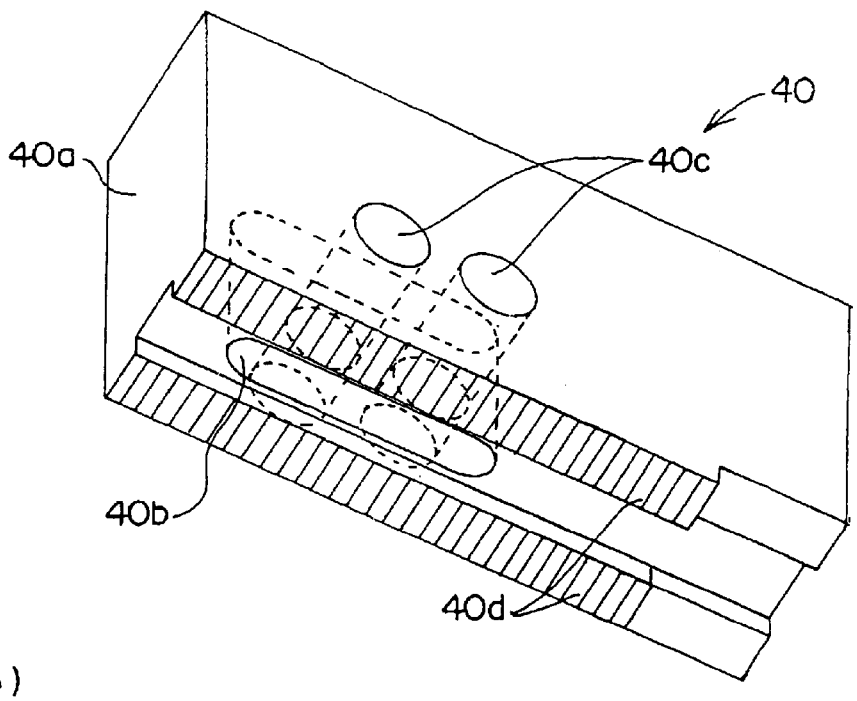
FIG. 4(a) is a perspective view of an example of the gripping claw.
FIG. 4(b) is a side elevation of the gripping claw.
FIG. 4(c) is a bottom plan view of the gripping claw.
Figure 4:
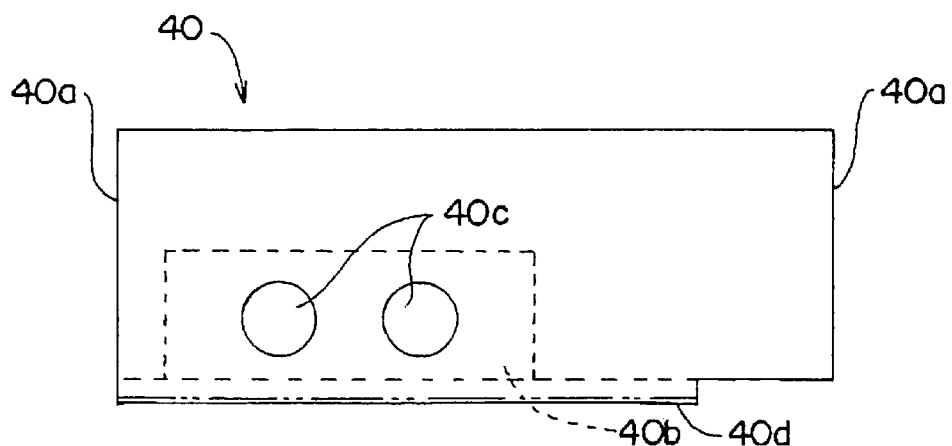
Figure 4:
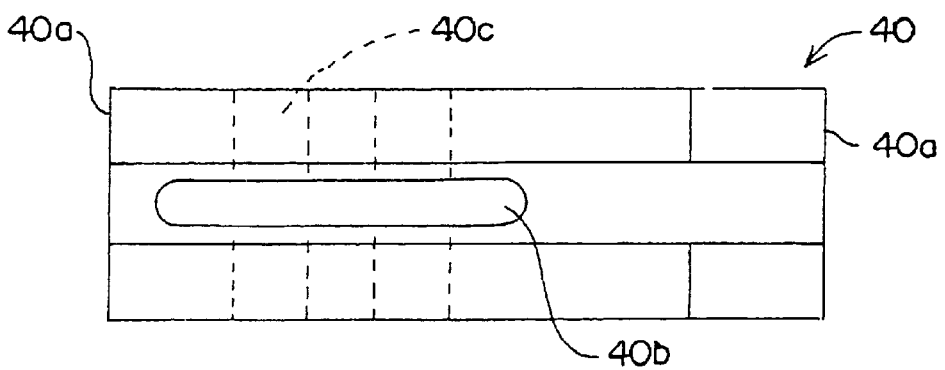
Figure 5:
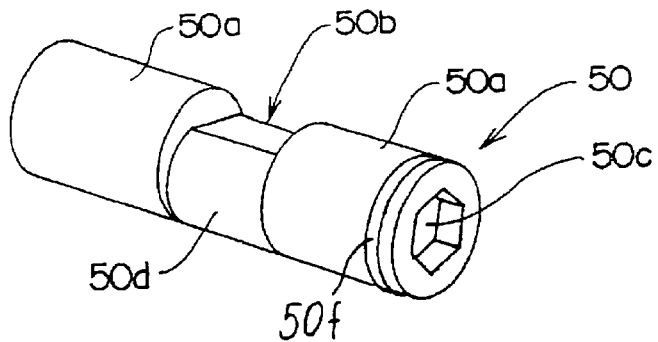
FIG. 5(a) is a perspective view of an example of the eccentric shaft.
FIG. 5(b) is a front elevation of the eccentric shaft.
FIG. 5(c) is a side elevation of the eccentric shaft.
FIG. 5(d) is a cross section of the eccentric shaft, taken along line I—I in FIG. 5(b).
Figure 5:
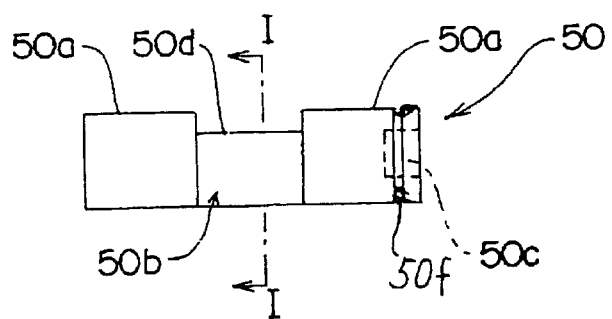
Figure 5:
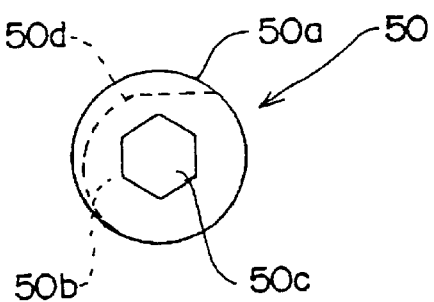
Figure 5:
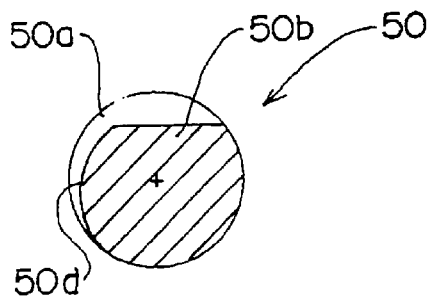

Referring to FIG. 4(a) to FIG. 4(c), one example of the gripping claw 40 is provided with work holding surfaces 40a, and a groove 40b in which the trunk 30b of the T nut 30 is fitted.

Two holes 40c are formed across the gripping claw 40, and receive stems 50a of the eccentric shafts 50 (as described in detail later) fitted in the groove 40b.

An example of the eccentric shaft 50 shown in FIG. 5(a) to FIG. 5(d) has the stem 50a, and the cam 50b to be inserted into the hole 30c of the T nut 30.

The eccentric shaft 50 is formed at its one side (i.e. at one end of one of the stems 50a) with a hexagonal opening 50c into which a hexagonal wrench (not shown) is inserted in order to turn the eccentric shaft 50.

The cam 50b of the eccentric shaft 50 has a flat part 50d which comes into contact with a flat part 30d of the hole 30c of the T nut 30 when the eccentric shaft 50 is turned.

Figure 6:
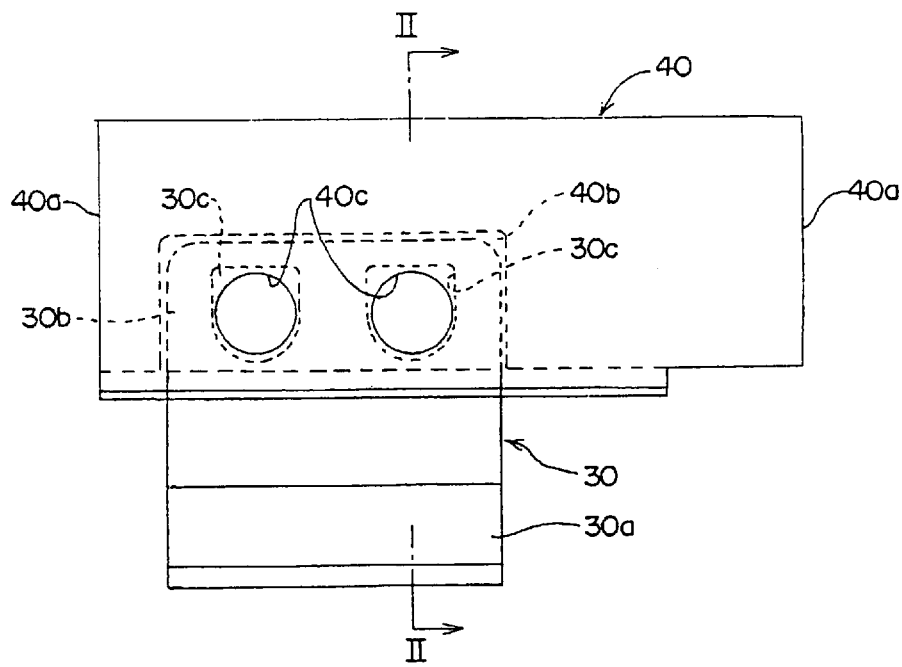
FIG. 6 is a side elevation showing the steps of attaching the gripping claw to the T nut.

The T nut 30 and the gripping claw 40 are attached to the master jaw 20 using the eccentric shaft 50 as follows. As shown in FIG. 6, with the T nut 30 and the gripping claw 40 separated from the master jaw 20, the trunk 30b of the T nut 30 is fitted in the groove 40b of the gripping claw 40 such that the centers of the holes 30c of the T nut 30 are substantially aligned with the centers of the holes 40c of the gripping claw 40.

Figure 7:
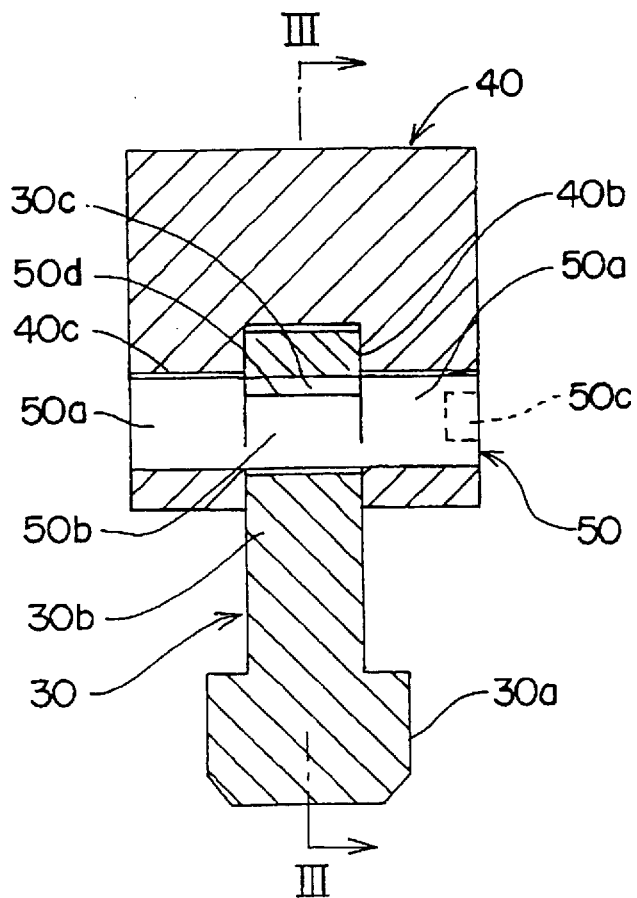
FIG. 7 is a cross section taken along line II—II in FIG. 6.
Figure 8:
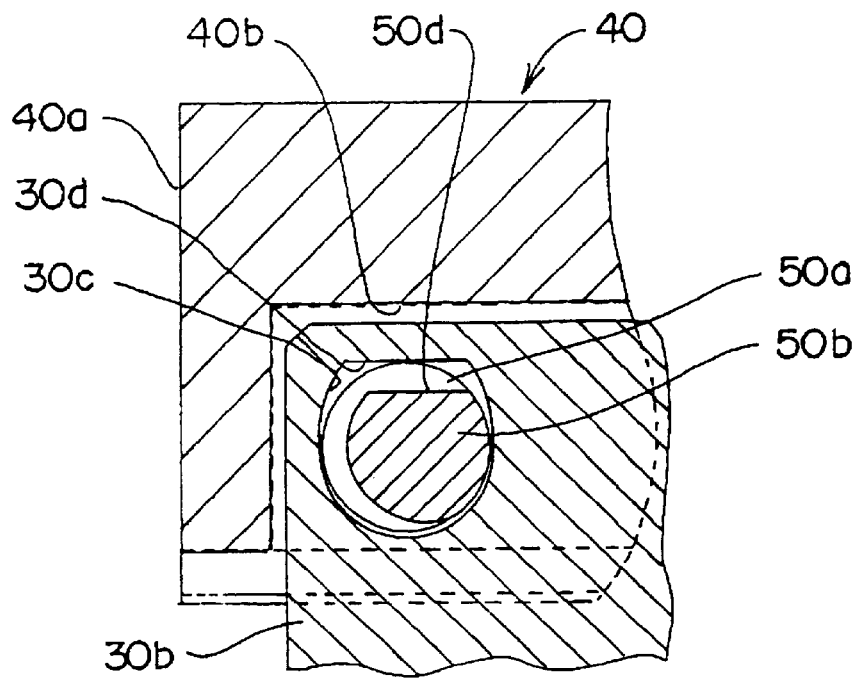
FIG. 8 is a cross section of the essential parts, taken along line III—III in FIG. 7.
Figure 9:
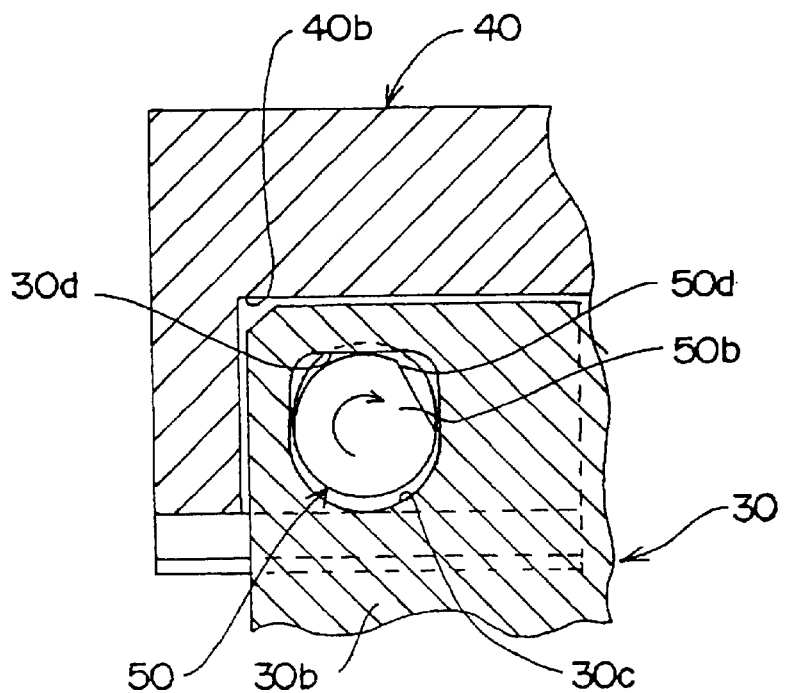
FIG. 9 is a view similar to FIG. 8, showing the state in which the eccentric shaft is turned in the T nut and the gripping claw which are assembled.
Figure 10:
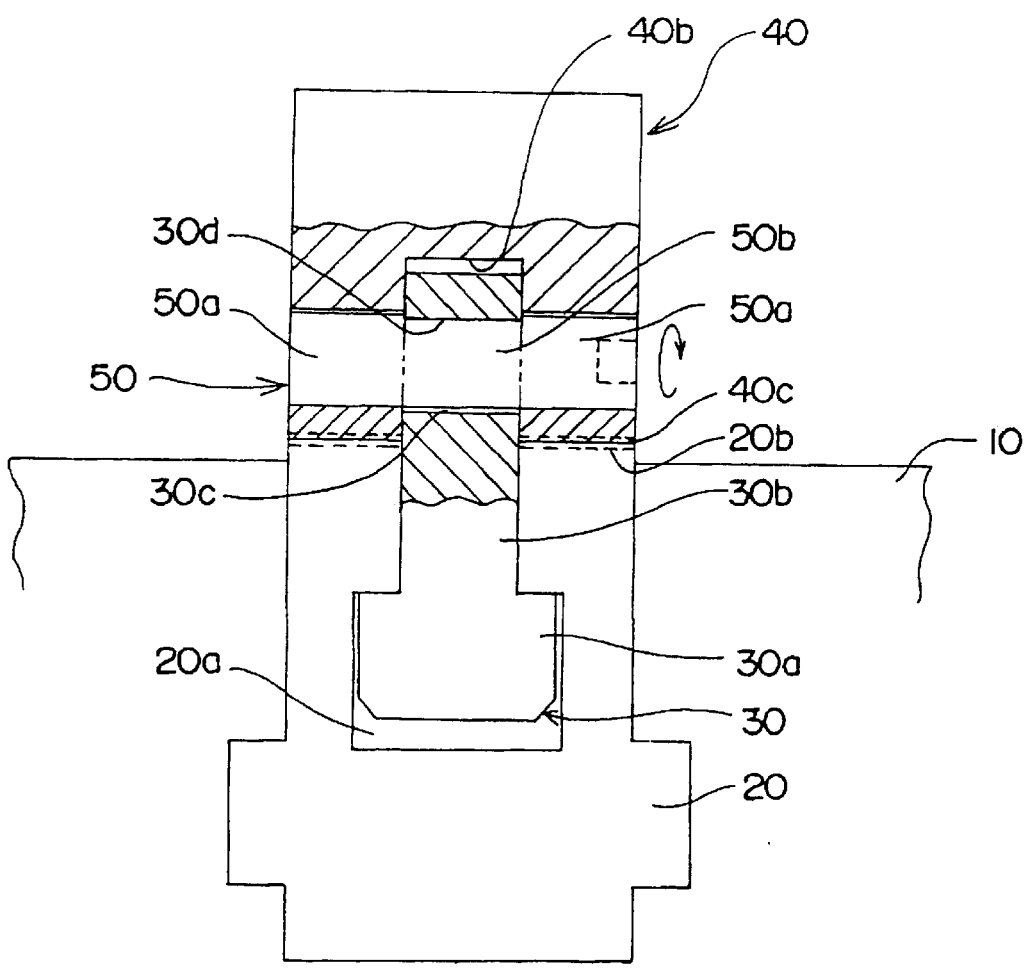
FIG. 10 is a schematic front elevation showing the state in which the T nut and gripping claw are attached to a master jaw by turning the eccentric shaft.

Referring to FIG. 7, the eccentric shaft 50 is inserted into the holes 30c and 40c. In this state, the cam 50b is positioned in the hole 30c of the T nut 30 and the stems 50a are positioned in the hole 40c of the gripping claw 40. Further, the eccentric shaft 50 has its flat part 50d faced with the flat part 30d of the hole 30c.

When the gripping claw 40 is raised in the assembled state, the T nut 30 comes down due to its own weight until the flat part 30d of the T nut 30 comes into contact with the flat part 50d of the eccentric shaft 50.

The sizes of the foregoing components are determined such that serrations 20b of the master jaw 20 are disengaged from serrations 40d on the bottom of the gripping claw 40 when the head 30a of the T nut 30 is fitted in the T-shaped groove 20a of the master jaw 20, as shown in FIG. 2.

The T nut 30 with its head 30a fitted in the T-shaped groove 20a of the master jaw 20 can be moved to a desired position along the normal of the chuck body 10 while the gripping claw 40 is being raised. In other words, the work holding surfaces 40a of the gripping claw 40 can be re-positioned in accordance with the shape of the work.

After positioning the gripping claw 40 on the master jaw 20, the hexagonal wrench is inserted into the hexagonal hole 50c of the eccentric shaft 50, and is operated to turn the eccentric shaft 50 in a predetermined direction (i.e. clockwise in this case). Thereafter, the flat part 50d of the cam 50b of the eccentric shaft 50 comes into contact with the flat part 30d of the hole 30c of the T nut 30, so that the T nut 30 and the gripping claw 40 relatively move to attract each other.

The relative movement of the T nut 30 and gripping claw 40 brings a step of the head 30a of the T nut 30 into contact with a step of the T-shaped groove 20a of the master jaw 20, and the serrations 40d of the gripping claw 40 are brought into engagement with the serrations 20d of the master jaw 20. As a result, the gripping screw 40 is firmly and reliably fixed to the master jaw 20.

The holes 30c of the T nut 30 into which the eccentric shafts 50 are inserted may be formed in heads of bolts 60 to be fitted into an existing T nut 3 (shown in FIGS. 27 and 28) that is used in the chuck of the related art.

The chuck can be made less expensive by using the existing T nuts 3 as the T nuts 30.

Figure 12:
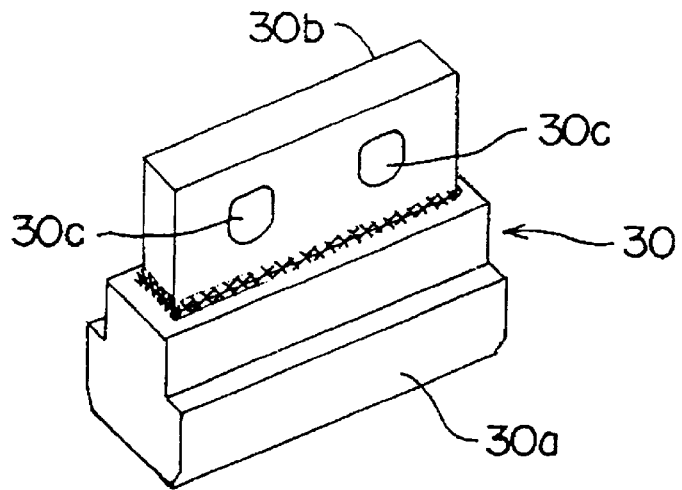
FIG. 12 is a perspective view of a further example of T nut.

In a further example, when the existing T nut 3 is applied to the chuck 100A, a metal block is welded onto the head 30a of the T nut 30 in order to form a trunk 30b, in which holes 30c may be made. Refer to FIG. 12.

In the example of FIG. 12, the T nut 30 has two tiers between the head 30a and trunk 30b, and only the trunk 30b on the upper tier is fitted into the groove 40b of the gripping claw 40. In the examples shown in FIGS. 2, 3, 6, 7 and 10, the T nuts 30 have one-tier structure. Alternatively, they may have two tiers, and only the trunk 30b at the upper tier may be fitted into the groove 40b of the gripping claw 40.

Figure 13:
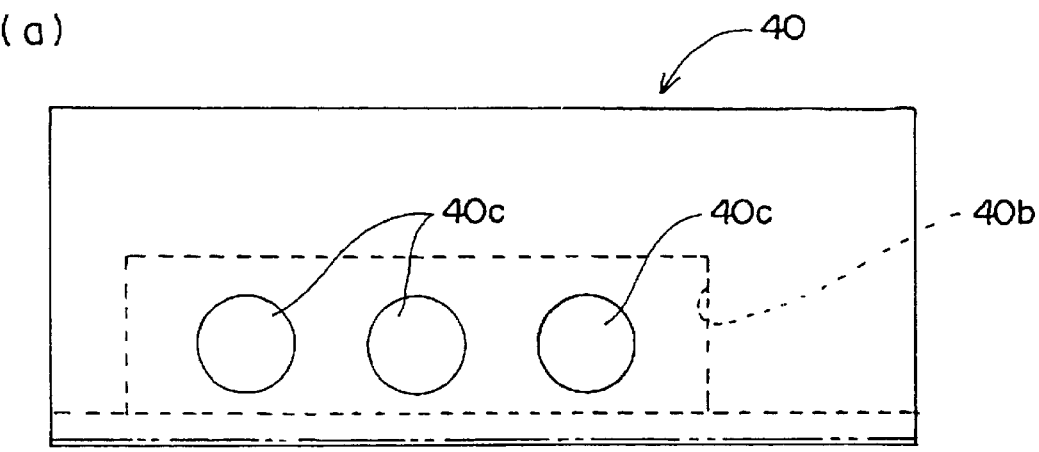
FIG. 13(a) is a side elevation of a further example of the gripping claw.
FIG. 13(b) is a bottom plan view of the gripping claw.
Figure 13:
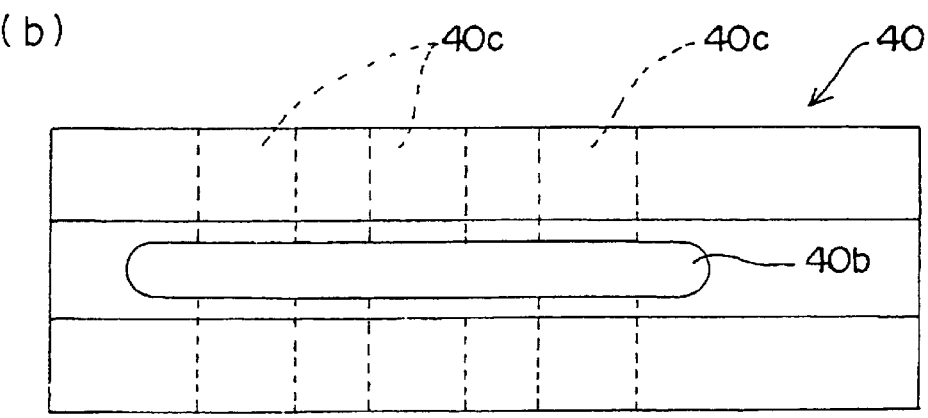

Referring to FIGS. 13(a) and 13(b), the gripping claw 40 may be provided with three holes 40c into which the stems 50a of the eccentric shafts 50 are inserted.

The gripping screws 40 can be positioned on the T nut 30 as desired in accordance with a shape and a size of the work by forming a plurality of holes 40c.

Figure 14:
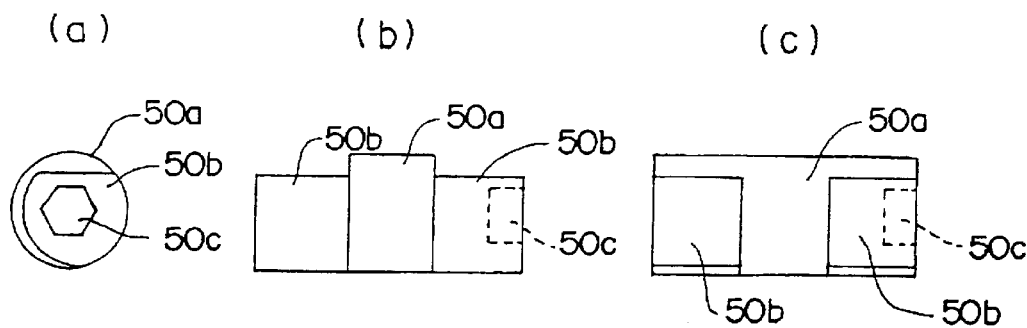
FIG. 14(a) is a side elevation of another example of the eccentric shaft.
FIG. 14(b) is a front elevation of the eccentric shaft.
FIG. 14(c) is a top plan view of the eccentric shaft.
Figure 15:
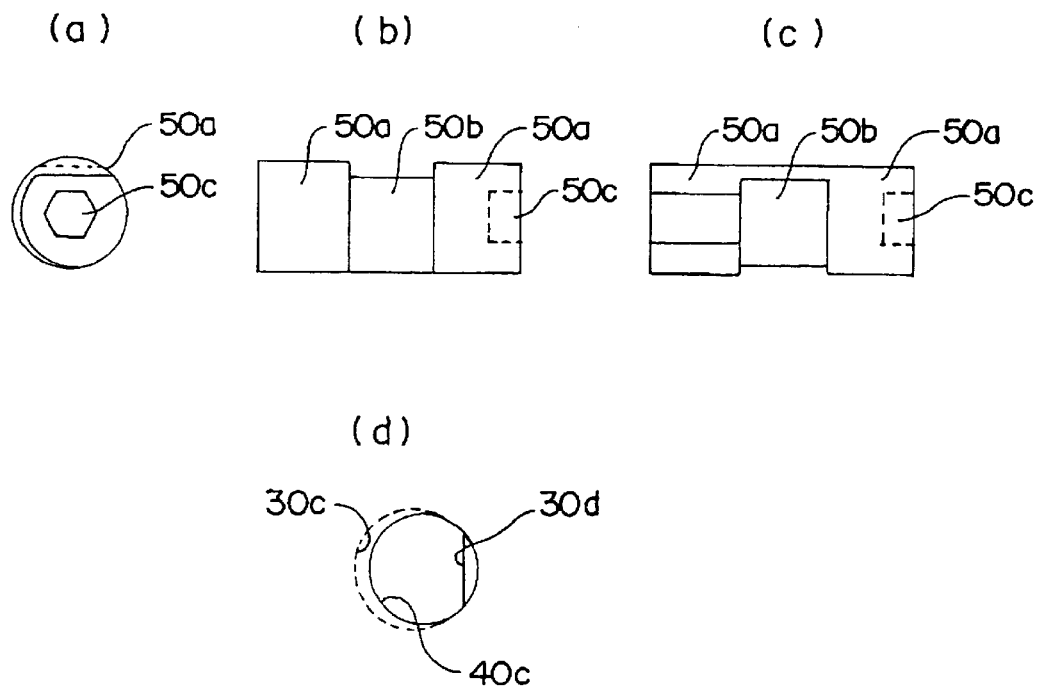
FIG. 15(a) is a side elevation of a further example of the eccentric shaft.
FIG. 15(b) is a front elevation of the eccentric shaft.
FIG. 15(c) is a top plan view of the eccentric shaft.
FIG. 15(d) is a side elevation of an example of holes in the gripping claw and the T nut into which the eccentric shaft is inserted.

FIG. 14(a) to FIG. 14(c) show an example of the eccentric shaft 50, of which stem 50a is inserted into the hole 30c of the T nut 30, and of which cam 50b is inserted into the hole 40c of the gripping claw 40. In this case, the hole 40c is formed in the gripping claw 40 so that its flat part is brought into contact with the flat part of the cam 50b.

In a still further example of the eccentric shaft 50 shown in FIGS. 15(a) to 15(d), one of the stems 50a at the opposite ends of the eccentric shaft 50 has an upper flat part.

As shown in FIG. 15(d), the hole 40c of the gripping claw 40 is circular, the hole 30c of the T nut 30 is made slightly larger than the hole 40c, and the flat part 30d of the hole 30c is visible through the hole 40c. The eccentric shaft 50 is provided with a flat part on one of its stems 50a. The eccentric shaft 50 is inserted into the holes 40c and 30c of the gripping claw 40 and T nut 30, respectively, with the foregoing flat part of the eccentric shaft 50 faced with the flat part 30d of the hole 30c of the T nut 30. This structure enables the eccentric shaft 50 to be inserted into the holes 40c and 30c with the T nut 30 fitted into the T-shaped groove of the master jaw 20 and with the trunk 30b of the T nut 30 caught in the gripping claw 40. Further, when the eccentric shaft 50 is turned, the gripping claw 40 and T nut 30 are attracted to each other and are fixedly attached to the chuck body 10.

In the foregoing structure, if the gripping claw 40 and the T nut 30 are not attracted to each other, the simply inserted eccentric shaft 50 may come out. In order to overcome this problem, the eccentric shaft 50 may have a large diameter portion or a peripheral groove 50f at one end thereof as shown in FIG. 5(a) to FIG. 5(d), and an annular stop may be fitted in the peripheral groove 50f. This structure enables the eccentric shaft 50 to be vertically inserted with the gripping claw 40 and T nut 30 laid low.

The eccentric shaft 50 may be formed using a non-threaded portion of an existing bolt having a hexagonal hole, or an existing hexagonal bolt.

Figure 16:
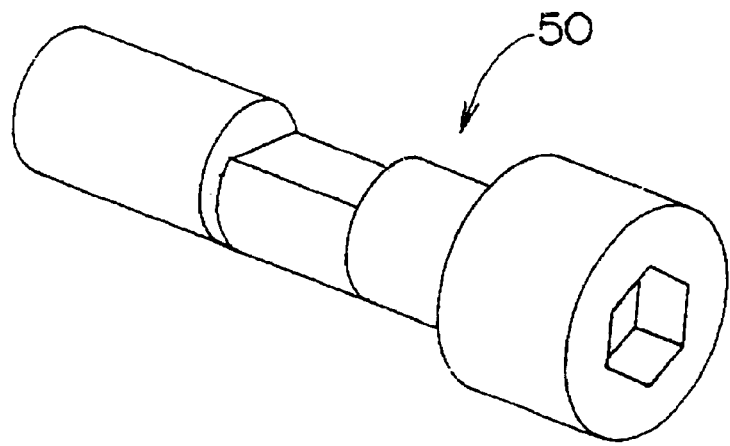
FIG. 16(a) is a perspective view of an existing bolt having a hexagonal hole and used as the eccentric shaft.
FIG. 16(b) is a perspective view of an existing hexagonal bolt used as the eccentric shaft.
FIG. 16(c) is a perspective view of another existing hexagonal bolt used as the eccentric shaft.
Figure 16:
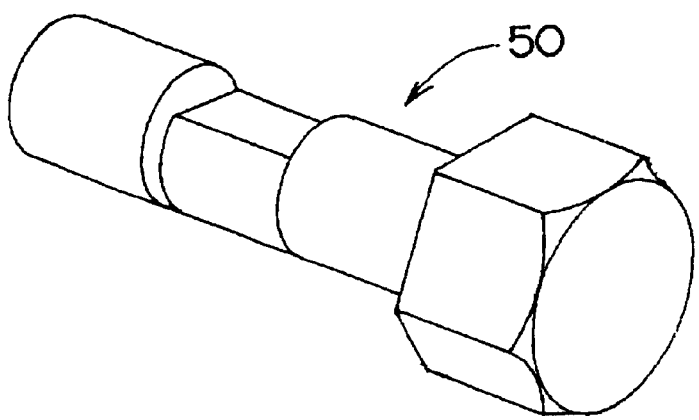
Figure 16:
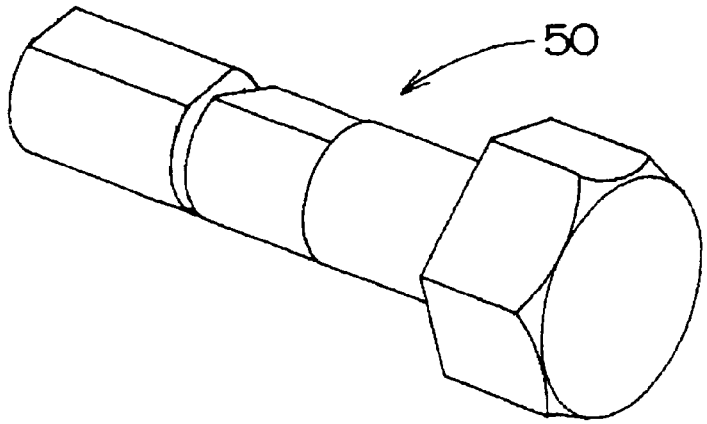

FIG. 16(a) shows that the eccentric shaft 50 is made by the bolt having the hexagonal hole; FIG. 16(b) shows that the hexagonal bolt is used to form the eccentric shaft 50; and FIG. 16(c) shows that another hexagonal nut is used to obtain the eccentric shaft 50 shown in FIG. 15.

Figure 17:
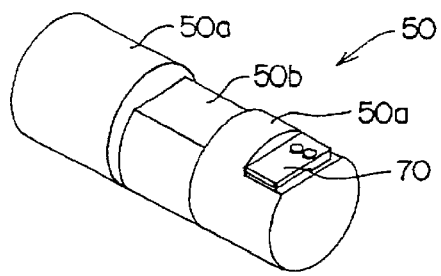
FIG. 17(a) is a perspective view of an eccentric shaft having a leaf spring as a turn stop.
FIG. 17(b) is a front elevation of the eccentric shaft.
FIG. 17(c) is a cross section of the essential parts, showing the state in which the eccentric shaft is turned in the gripping claw.
FIG. 17(d) is a side elevation of an example of the eccentric shaft having an effective turn stop, and holes in the T nut and the gripping claw.
FIG. 17(e) is a side elevation showing the state in which the T nut and the gripping claw are fastened by the eccentric shaft.
Figure 17:
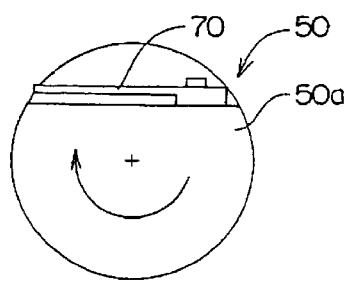
Figure 17:
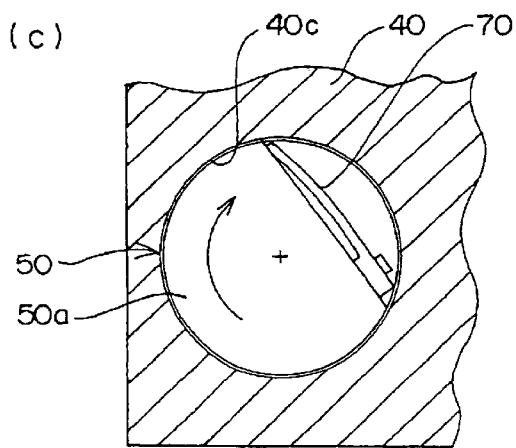
Figure 17:
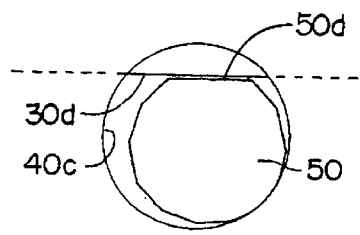
Figure 17:
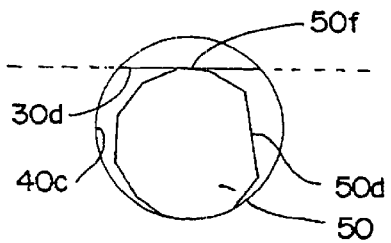

Referring to FIG. 17(a) to FIG. 17(c), one of the stems 50a of the eccentric shaft 50 is partly made flat. A leaf spring 70 may be attached to the flat part of the stem 50a in a cantilever state, and have a tip thereof engaged in the hole 40c of the gripping claw 40, thereby functioning as a turn stop.

As shown in FIG. 17(c), the leaf spring 70 flexes as it is engaged in the hole 40c via its tip, and comes into pressure contact with the hole 40c by the flexibility thereof. This prevents the eccentric shaft 50 from turning in a direction where it loosely fits in the hole 40c when it is vibrated by external forces or the like. Therefore, the gripping claw 40 can be firmly and reliably attached to the T nut 30.

Referring to FIGS. 17(d) and 17(e), the cam 50b of the eccentric shaft 50 may be polygonal in order to prevent itself from becoming loose when the gripping claw 40 and the T nut 30 are fastened. In this case, one of flat parts 50f of the cam 50b of the eccentric shaft 50 comes into contact with the flat part 30d of the T nut 30, so that the eccentric shaft 50 is difficult to turn and is slow to become loose.

Figure 18:
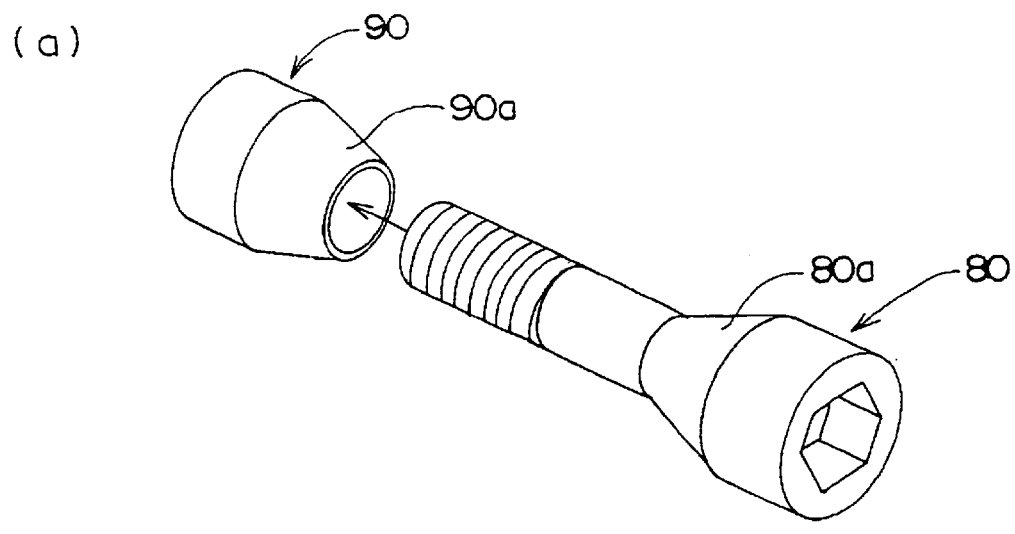
FIG. 18(a) is a perspective view of a bolt and a nut for attaching a gripping claw to a chuck according to one embodiment of the present invention.
FIG. 18(b) is a cross sectional view of the bolt and nut shown in FIG. 18(a) when inserted into the holes in the T nut and the gripping claw.
Figure 18:
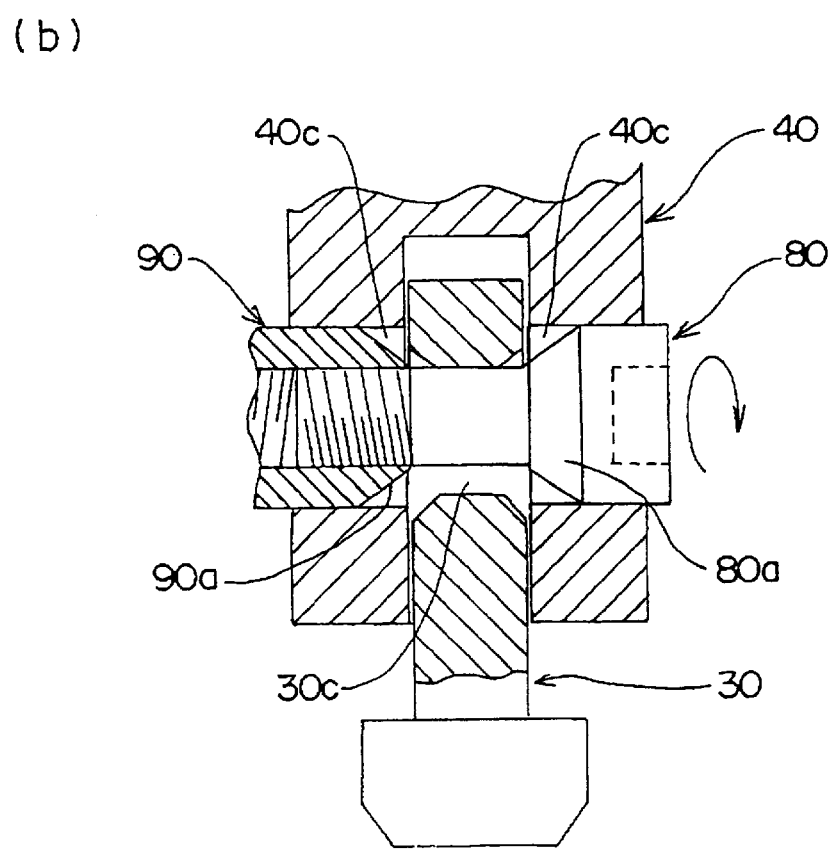

Further, the gripping claw 40 may be attached to the chuck 100A using a bolt 80 and a nut 90 as shown in FIGS. 18(a) and 18(b). The bolt 80 and nut 90 are provided with tapered parts 80a and 90a to be inserted into the hole 30c of the T nut 30 and hole 40c of the gripping claw 40, respectively.

Referring to FIG. 18(b), the bolt 80 and the nut 90 are inserted into the hole 30c of the T nut 30 and the hole 40c of the gripping claw 40 via the opposite sides of the gripping claws 40. Thereafter, the nut 90 is screwed into the bolt 80, so that both of them are attracted each other. In this state, the T nut 30 and the gripping claw 40 are relatively moved on the tapered portions 80a and 90a of the bolt 80 and the nut 90, so that the gripping claw 40 is attached to the master jaw 20.

Figure 11:
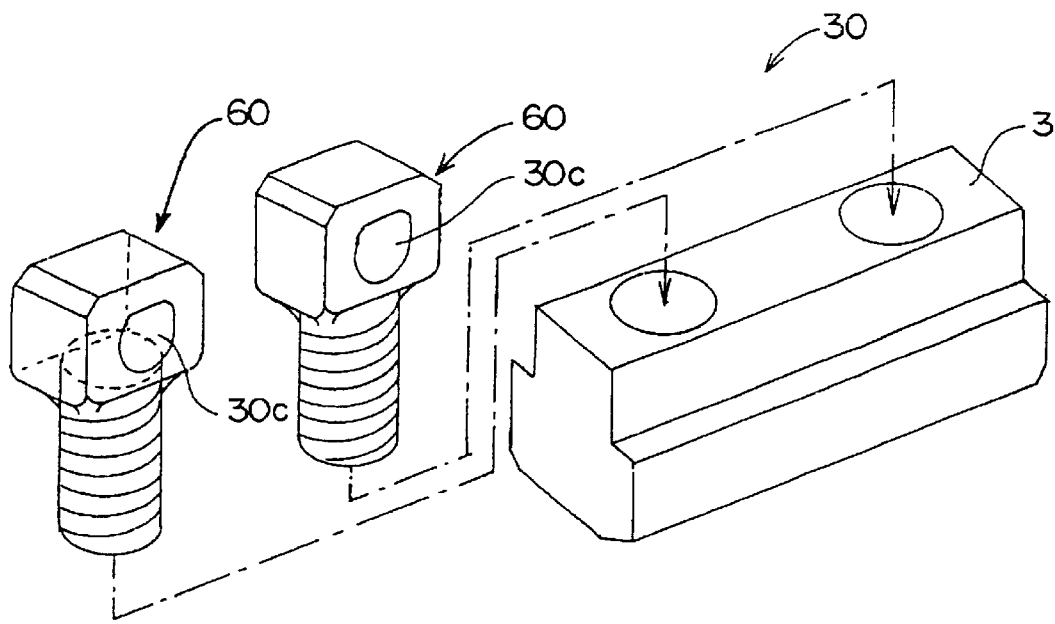
FIG. 11(a) is an exploded perspective view of another example of T nut.
FIG. 11(b) is a perspective view of the T nut.
Figure 11:
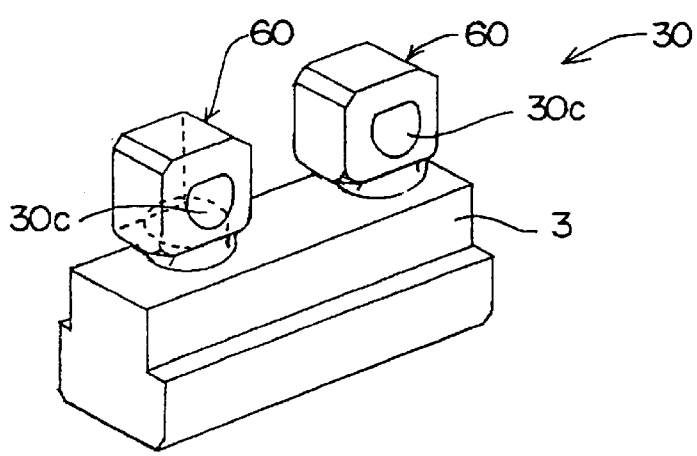
Figure 19:
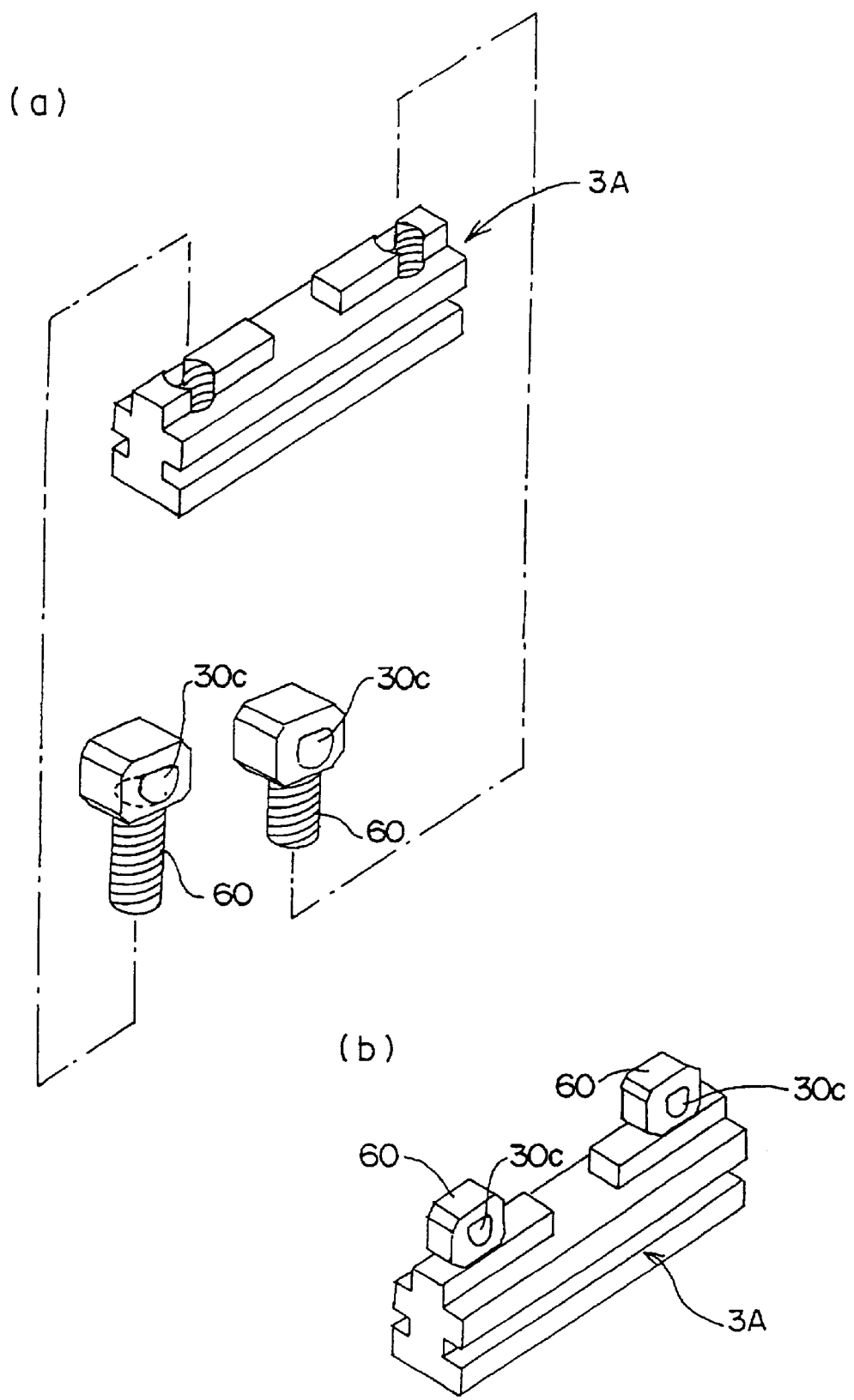
FIG. 19(a) is an exploded perspective view of a T nut used for a chuck in an engine lathe.
FIG. 19(b) is a perspective view of the T nut.
Figure 20:
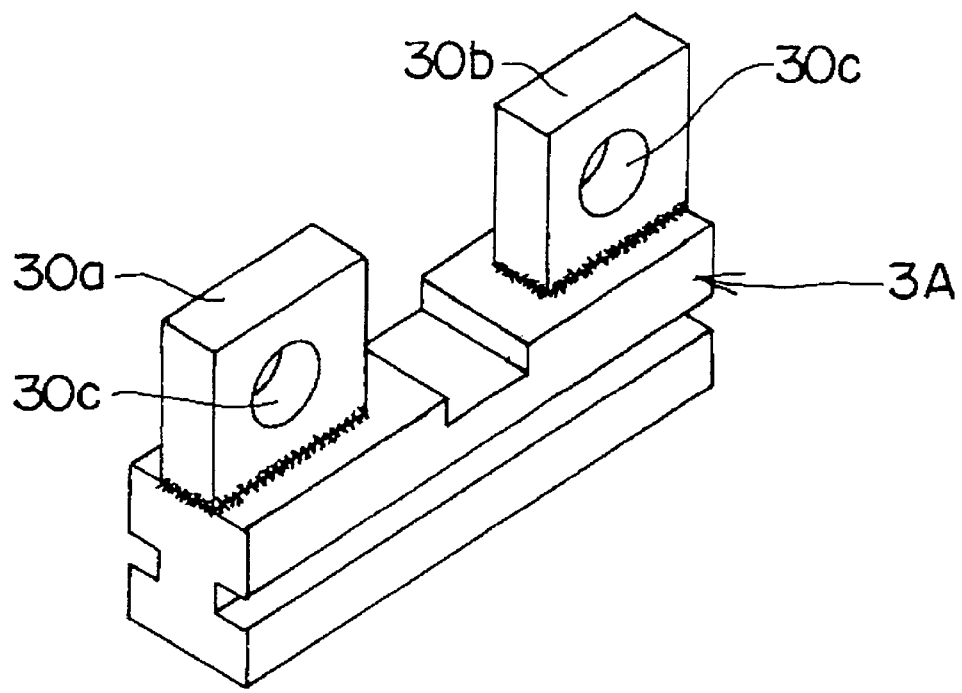
FIG. 20 is a perspective view of another example of the T nut of the chuck in the engine lathe.

If the gripping claw 40 is attached to a T nut used in an engine lathe, bolts 60 having holes 30c (see FIGS. 11(a) and 11(b)) may be fitted into screw holes on the upper surface of the T nut 3A as shown in FIGS. 19(a) and 19(b).

Alternatively, the gripping claw 40 may be attached to the T nut 3A by welding metal blocks on the upper surface thereof in order to form trunks 30b. In this case, the trunks 30b are formed with holes 30c.

In the foregoing description, when the gripping claw is attached to the T nut by turning the eccentric shaft, the eccentric shaft comes at one position into contact with the hole of the gripping claw.

When the gripping claws grip the work via the inner or outer work holding surfaces thereof, force is applied to raise the gripping claw from the mater jaw using as a fulcrum the contact area of the eccentric shaft and the hole of the gripping claw. In order to reliably receive this force and support the gripping claws, the eccentric shafts may come into contact with the holes of the gripping claws at a plurality of positions as shown in FIGS. 21 to 24.

Figure 21:
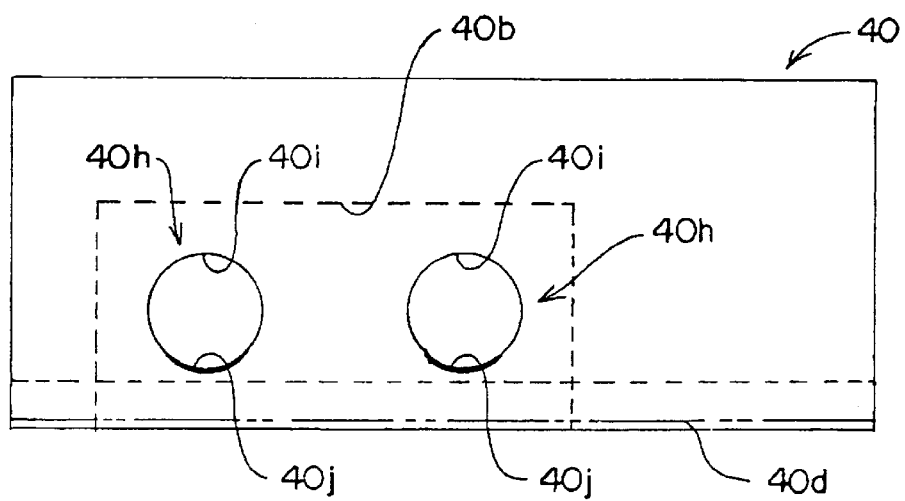
FIG. 21 is a side elevation of a gripping claw which is usable in the present invention.
Figure 22:
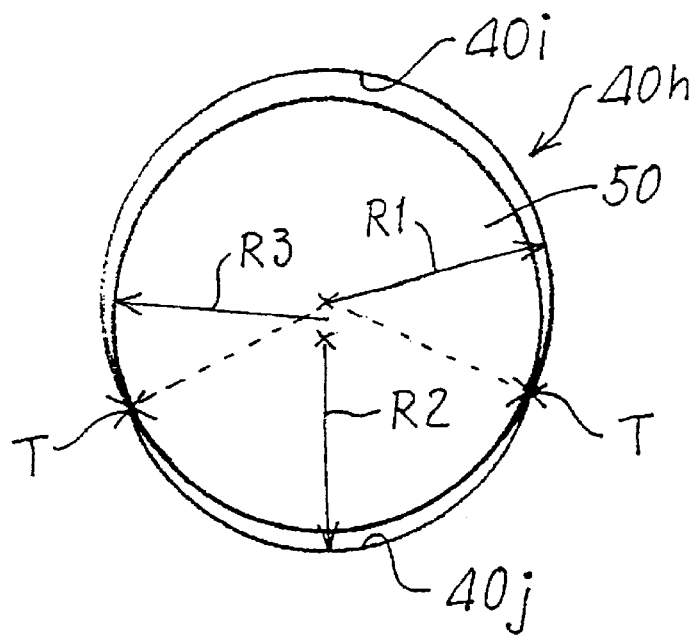
FIG. 22 is an enlarged side elevation showing the relationship between of a hole in the gripping claw of FIG. 21 and the eccentric shaft.

In an example shown in FIGS. 21 and 22, a hole 40h of the gripping claw 40 into which the eccentric shaft 50 is inserted includes a circular hole 40i with a radius R1 and a concave 40j. The concave 40j is formed by cutting off a lower part of the hole 40i with a radius R2 smaller than R1. In this example, the eccentric shaft 50 comes into contact with opposite edges T where the hole 40i and the concave 40j are in contact with each other.

A radius R3 of the stem 50b of the eccentric shaft 50 is smaller than the radius R1 of the hole 40i in the gripping claw 40 but is larger than the radius R2 of the recess 40j. Therefore, when turned in order to make the gripping claw 40 and T nut 30 integral with the master jaw 20, the eccentric shaft 50 is brought into contact with the edges T via the peripheral surface thereof. This enables the eccentric shaft 50 to be reliably supported by the gripping claw 40. As a result, even if load is applied, the gripping claw 40 can be prevented from being raised from the master jaw 20, and can be reliably supported.

If the steps T are chamfered in accordance with the portion 50 having the radius R3, the stem 50b of the eccentric shaft 50 is brought into surface contact therewith, so that the eccentric shaft 50 may be more reliably supported.

Figure 23:
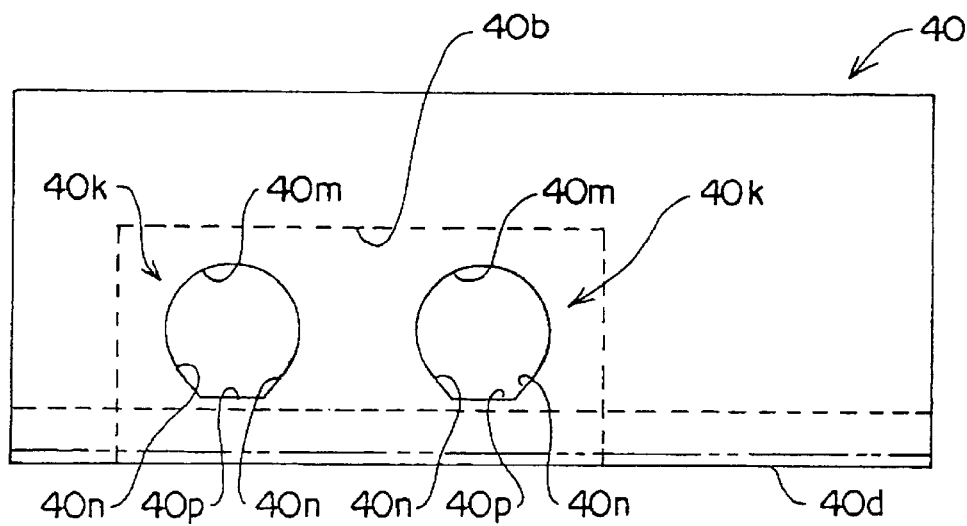
FIG. 23 is a side elevation of another example of the gripping claw which is usable in the invention.
Figure 24:
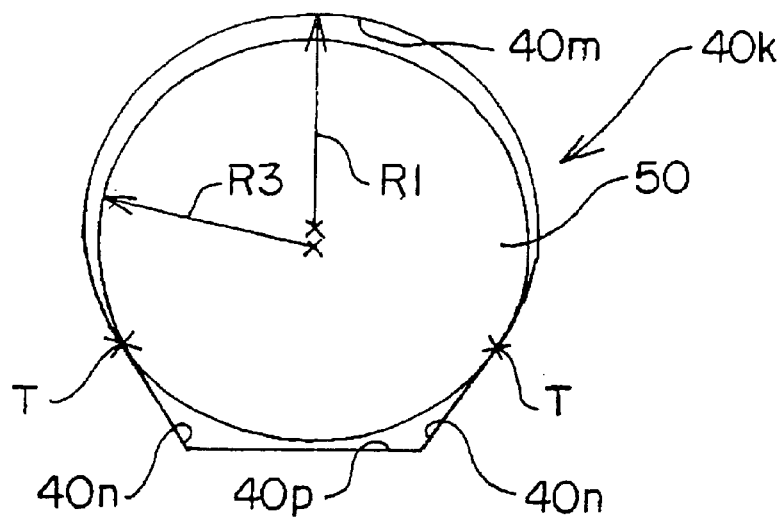
FIG. 24 is an enlarged side elevation showing the relationship between a hole in the gripping claw and the eccentric shaft.

In an example shown in FIGS. 23 and 24, the gripping claw 40 is formed with a hole 40k in order to receive the eccentric shafts 50. The hole 40k includes a hole 40m having the radius R1 and a recess. The recess is formed by cutting off a part of the hole 40m in accordance with lines 40n (i.e. the tangents of the hole 40m) and a flat part 40P extending between the lines 40n. The eccentric shaft 50 comes into contact with edges T on the lines 40n.

The radius R3 of the stem 50b of the eccentric shaft 50 is slightly smaller than the radius R1 of the hole 40m in order to prevent the eccentric shaft 50 from falling into the foregoing recess. Therefore, when the eccentric shaft 50 is turned to make the gripping claw 40 and the T nut 30 integral with the master jaw 20, the outer surface of the eccentric shaft 50 is brought into contact with the edges T on the lines 40n. This enables the eccentric shaft 50 to be brought into contact with the hole 40k at the two positions and reliably fitted in the gripping claw 40. The gripping claw 40 can be reliably supported even if load is applied thereto in order to raise it from the master jaw 20.

In the chucks 100A of the foregoing embodiment, not only the holes 30c of the T nuts 30 but also the holes 40c, 40h and 40k of the gripping claws 40 are formed across the T nuts 30 and the gripping claws 40 which are engaged with one another.

Figure 27:
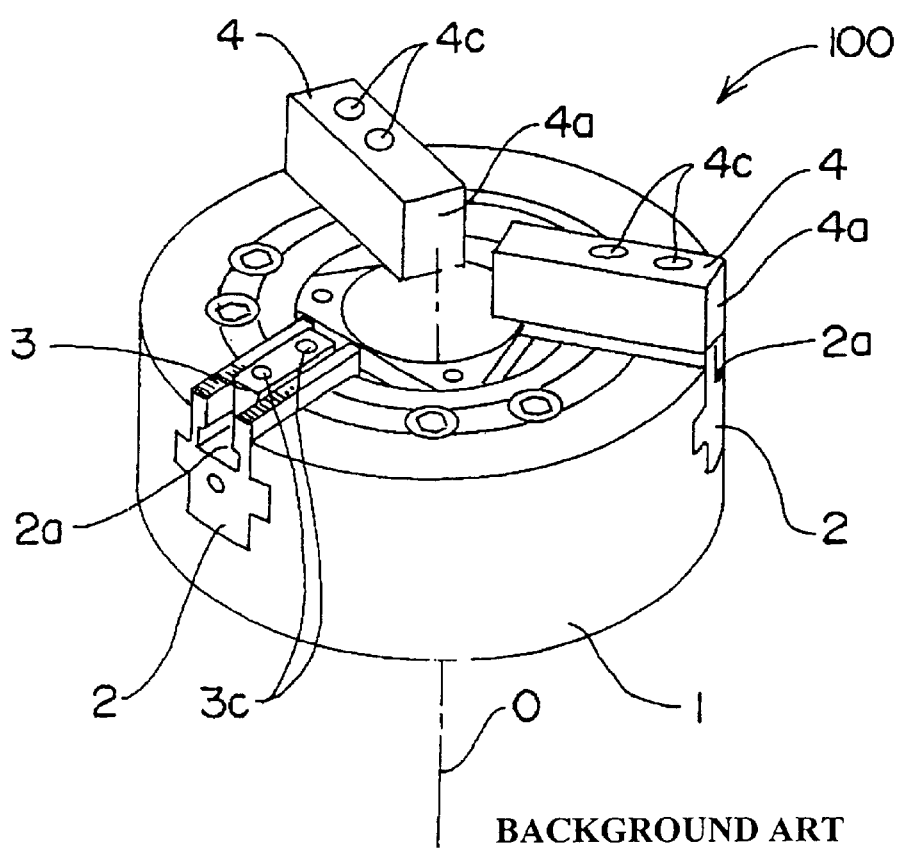
FIG. 27 is a perspective view of a chuck of the related art.
Figure 28:
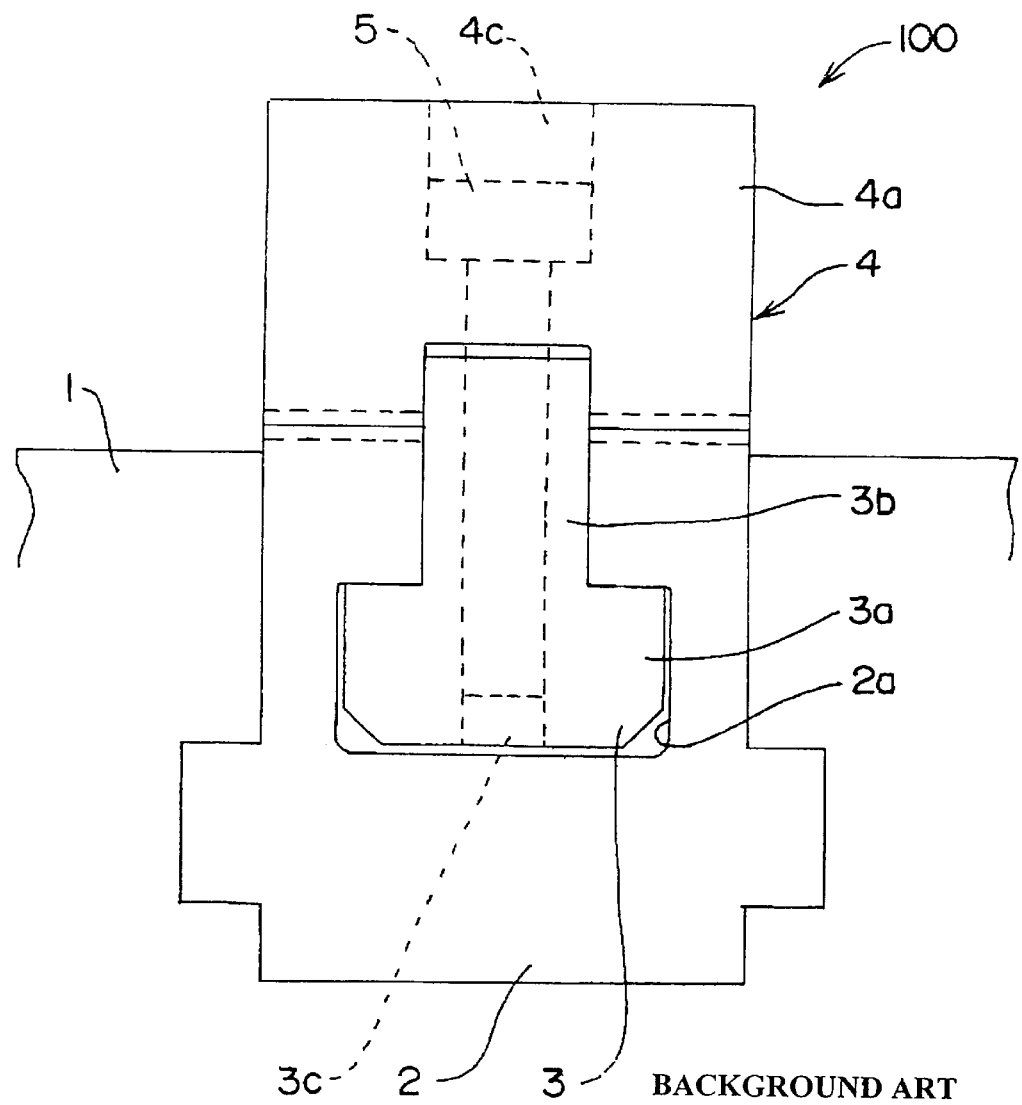
FIG. 28 is a front elevation showing the state in which essential parts such as a T nut, a gripping claw and an eccentric shaft are attached to a master jaw.

Therefore, the holes 40c, 40h or 40k occupy relatively small spaces of the gripping claw 40 compared with those of the related art shown in FIGS. 27 and 28, which enables the gripping claws 40 to have larger reshaping margins at the work holding surfaces 4a.

Figure 25:
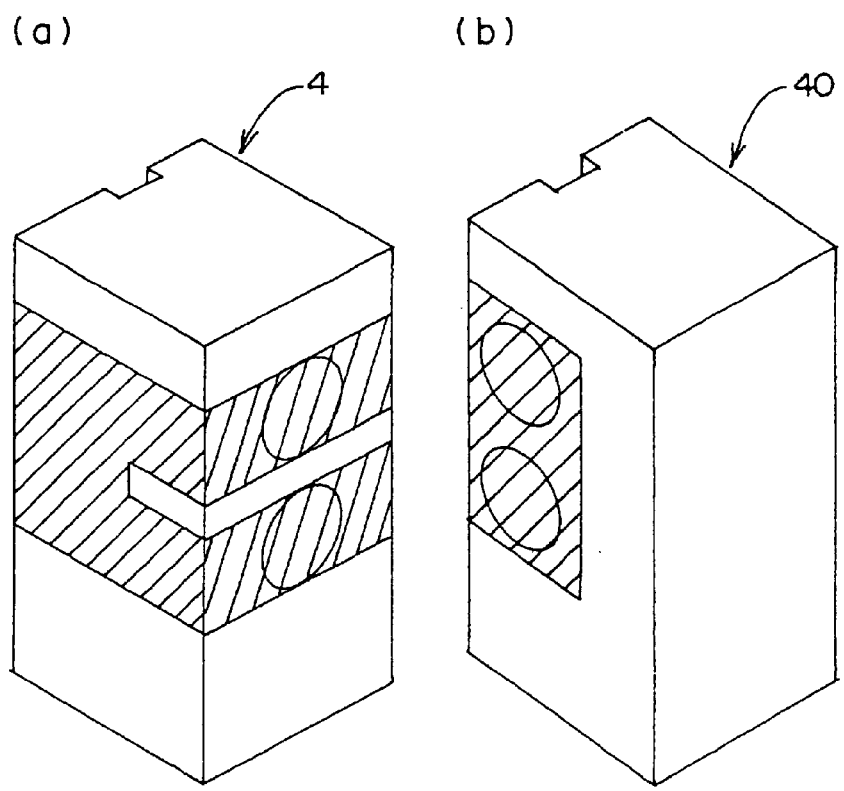
FIG. 25(a) is a schematic perspective view showing a reshaping margin of a gripping claw used in a chuck of the related art.
FIG. 25(b) is a schematic perspective view showing a reshaping margin of the gripping claw in the chuck of the present invention.
Figure 26:
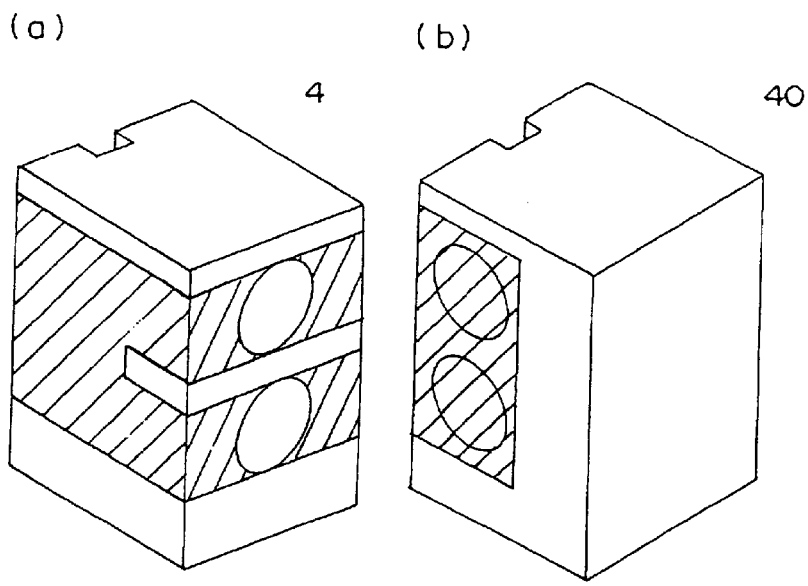
FIG. 26(a) is a schematic perspective view showing a reshaping margin of a gripping claw used in another chuck of the related art.
FIG. 26(b) is a schematic perspective view showing a reshaping margin of a further gripping claw in the chuck of the present invention.

In FIGS. 25(a) and 26(a), the non-shaded portions denote the reshaping margins of the gripping claws of the related art while in FIGS. 25(b) and 26(b), the non-shaded portions denote the reshaping margins of the gripping claws 40 of the present invention. This means that the gripping claws 40 of this invention have larger reshaping margins than those of the gripping claws 4 of the related art.

Specifically, FIGS. 25(a) and 25(b) show long gripping claws 4 and 40 while FIGS. 26(a) and 26(b) show short gripping claws 4 and 40 which are easy to use.

The invention has been described with respect to the chuck which is provided on one end surface thereof with three sets of gripping claws 40, T nuts 30 and master jaws 20 that are equally spaced by 120 ° C. Needless to say, the invention is also applicable to a four-jaw chuck, a five-jaw chuck and so on.

Various kinds of jigs will be used in order to hold the gripping claws when they are reshaped in accordance with shapes of works. Each gripping claw may be formed a vertical hole which is orthogonal to the holes into which the eccentric shafts are inserted. Even when this additional hole is provided, the gripping claw can have a large reshaping margin on its work holding surfaces, and can have a long life.

With the chuck of the related art, when detaching the gripping claws from the chuck body, screws have to be turned in a rotating direction of the spindle of the chuck. Therefore, if the spindle itself does not have a certain resistance, the chuck body tends to turn, which makes it difficult to turn the screw. In order to overcome this problem, the spindle is switched to a low speed mode in order to obtain a large resistance when detaching the gripping claws. On the contrary, with the present invention, the eccentric shafts are inserted into the gripping claw in a direction which is right angles with the spindle, and is turned in a plane which is orthogonal to the rotating plane of the spindle. Therefore, even if the spindle is in a high speed rotation mode, the gripping claws can be easily and quickly detached as desired without changing the rotation mode of the spindle.

What is claimed is:

1. A chuck comprising:
   a chuck body capable of being attached to a spindle of a machine tool;
   a plurality of master jaws attached to the chuck body along the normal of the chuck body and formed with T-shaped grooves extending along the length thereof,
   a plurality of T nuts having tops and trunks, the tops being slidably fitted in the T-shaped grooves of the master jaws;
   a plurality of gripping claws having work holding surfaces and grooves for engagement with the trunks of the T nuts; and
   a plurality of claw attaching members inserted in holes in the T nuts and the gripping claws and used for attaching the gripping claws to the T nuts;
   wherein:
      the holes are formed across the T nuts and the gripping claws which are engaged with one another;
      the claw attaching members include eccentric shafts which have eccentric cams, are rotated and relatively move the T nuts and the gripping claws;
      the holes in the T nuts are provided with cam parts with which the eccentric cams of the eccentric shafts come into contact;
      the holes in the T nuts have cam parts with which the cams of the eccentric shafts come into contact, and the cams of the eccentric shafts are positioned in accordance with the holes of the T nuts; and
      the holes in the T nuts have flat parts and the claw attaching members have flat parts leading to the cam part and facing with the flat parts in the holes in the T nuts.

2. The chuck of claim 1, wherein each claw attaching member comes into contact with the gripping claw at two positions.

3. The chuck of claim 1, wherein the hole of the T nut into which the claw attaching member is fitted is formed on a head of a bolt fitted into the T nut.

4. The chuck of claim 1, wherein the cam parts of the holes are flat.

5. A chuck comprising:
   a chuck body capable of being attached to a spindle of a machine tool;
   a plurality of master jaws attached to the chuck body along the normal of the chuck body and formed with T-shaped grooves extending along the length thereof;
   a plurality of T nuts having tops and trunks, the tops being slidably fitted in the T-shaped grooves of the master jaws;
   a plurality of gripping claws having work holding surfaces and grooves for engagement with the trunks of the T nuts; and
   a plurality of claw attaching members inserted in holes in the T nuts and the gripping claws and used for attaching the gripping claws to the T nuts;
   wherein:
      the holes are formed across the T nuts and the gripping claws which are engaged with one another;
      the claw attaching members include eccentric shafts which have eccentric cams, are rotated and relatively move the T nuts and the gripping claws;
      the holes in the T nuts are provided with cam parts with which the eccentric cams of the eccentric shafts come into contact; and
      the eccentric shafts are provided with leaf springs which function as turn stops when tips thereof are engaged in the holes of the gripping claws.

6. A chuck comprising:
   a chuck body capable of being attached to a spindle of a machine tool;
   a plurality of master jaws attached to the chuck body along the normal of the chuck body and formed with T-shaped grooves extending along the length thereof;
   a plurality of T nuts having tops and trunks, the tops being slidably fitted in the T-shaped grooves of the master jaws;
   a plurality of gripping claws having work holding surfaces and grooves for engagement with the trunks of the T nuts; and
   a plurality of claw attaching members inserted in holes in the T nuts and the gripping claws and used for attaching the gripping claws to the T nuts;
   wherein:
      the holes are formed across the T nuts and the gripping claws which are engaged with one another;
      the claw attaching members include eccentric shafts which have eccentric cams, are rotated and relatively move the T nuts and the gripping claws;
      the holes in the T nuts are provided with cam parts with which the eccentric cams of the eccentric shafts come into contact;
      each claw attaching member comes into contact with the gripping claw at two positions; and
      each hole of each gripping claw has a recess on a peripheral edge thereof; and the claw attaching member comes into contact with the opposite edges of the recess.

7. The chuck of claim 6, wherein: the hole in the gripping claw is circular; and the claw attaching member is cylindrical at a position where it is fitted into the hole of the gripping claw, and the cylindrical portion has a diameter smaller than a diameter of the hole of the gripping claw.

8. A gripping claw for a chuck capable of being attached to a machine tool spindle, comprising:
   a body having a groove and a plurality of engaging holes, the groove being configured to engage with a trunk portion of a T nut provided onto the chuck, the plurality of engaging holes positioned to communicate with a plurality of holes formed in the trunk portion of the T nut and configured to receive a plurality of claw attaching members for attachment to the T nut, respectively,
   wherein:
      the claw attaching members include eccentric shafts having eccentric cams;
      the holes in the T nut into which the plurality of claw attaching members are inserted have cam parts with which the cams of the eccentric shafts come into contact in response to the rotation of the eccentric shafts;

the gripping claw is fixedly attached to the T nut when the plurality of claw attaching members are turned and the cams of the eccentric shafts and the cam parts of the holes in the T nut are in contact with one another; and the plurality of engaging holes each has a recess and an opposite portion configured to engage with a respective one of the claw attaching members.

9. The gripping claw of claim 8, wherein:

the plurality of engaging holes are circular;

the claw attaching members have cylindrical portions, respectively, at positions where fitted into the plurality of engaging holes; and the cylindrical portions have a diameter smaller than a diameter of the engaging holes.

10. The gripping claw of claim 8, wherein the cam parts are flat.

11. A chuck comprising:

a chuck body capable of being attached to a spindle of a machine tool;

a plurality of master jaws detachably attached to the chuck body and each having a T-shaped groove;

a plurality of T nuts each having a top portion and a trunk portion, the top portion being slidably engaged into in the T-shaped groove, the trunk portion having a plurality of holes;

a plurality of gripping claws each having a groove and a plurality of engaging holes, the groove being detachably engaged with the trunk portion, the plurality of engaging holes positioned to communicate with the plurality of holes in the trunk portion, respectively; and a plurality of claw attaching members slidably inserted into the plurality of holes and the plurality of engaging holes, respectively, the plurality of claw attaching members configured to engage the pluralities of T nuts and claw members, respectively, wherein:

the plurality of engaging holes each have a recess on a peripheral edge thereof; and the recess has an opposite end portion configured to engage with a respective one of the plurality of claw attaching members.

12. The chuck of claim 11, wherein:

the plurality of holes each have a cam portion; and the plurality of claw attaching members each have an eccentric cam portion configured to engage with the cam portion of a respective one of the plurality of holes in the trunk portion.

13. The chuck of claim 11, wherein the plurality of claw attaching members each include a leaf spring positioned to operate as a turn stop when engaged in a respective one of the engaging holes.

14. The chuck of claim 11, wherein the plurality of claw attaching members each include a tapered bolt and a tapered nut on which respective ones of the pluralities of T nuts and gripping claws are relatively displaced when inserted into the holes in the T nuts and the gripping claws.

15. The chuck of claim 11, wherein:

the trunk portion comprises at least one bolt detachably fitted into the top portion; and the at least one bolt has a hole at a head portion of the at least one bolt as one of the plurality of holes.

16. A chuck comprising:

a chuck body capable of being attached to a spindle of a machine tool;

a plurality of master jaws detachably attached to the chuck body and each having a T-shaped groove;

a plurality of T nuts each having a top portion and a trunk portion, the top portion being slidably engaged into in the T-shaped groove, the trunk portion having a plurality of holes;

a plurality of gripping claws each having a groove and a plurality of engaging holes, the groove being detachably engaged with the trunk portion, the plurality of engaging holes positioned to communicate with the plurality of holes in the trunk portion, respectively; and a plurality of claw attaching members slidably inserted into the plurality of holes and the plurality of engaging holes, respectively, the plurality of claw attaching members configured to engage the pluralities of T nuts and claw members, respectively, wherein the plurality of claw attaching members each include a leaf spring positioned to turn stop when engaged in a respective one of the engaging holes.

17. The chuck of claim 16, wherein:

the plurality of holes each have a cam portion; and the plurality of claw attaching member each have an eccentric cam portion configured to engage with the cam portion of a respective one of the plurality of holes in the trunk portion.

18. The chuck of claim 16, wherein the plurality of claw attaching members each include a tapered bolt and a tapered nut on which respective ones of the pluralities of T nuts and gripping claws are relatively displaced when inserted into the holes in the T nuts and the gripping claws.

19. The chuck of claim 16, wherein:

the trunk portion comprises at least one bolt detachably fitted into the top portion; and the at least one bolt has a hole at a head portion of the at least one bolt as one of the plurality of holes.

* * * * *